(12) United States Patent
Mitra et al.

(10) Patent No.: US 11,194,746 B2
(45) Date of Patent: Dec. 7, 2021

(54) EXCHANGING DRIVE INFORMATION

(71) Applicant: Seagate Technology LLC, Cupertino, CA (US)

(72) Inventors: Sumanranjan Swadesranjan Mitra, Mumbai (IN); Robert Walker, Clearwater Beach, FL (US)

(73) Assignee: Seagate Technology LLC, Fremont, CA (US)

( * ) Notice: Subject to any disclaimer, the term of this patent is extended or adjusted under 35 U.S.C. 154(b) by 260 days.

(21) Appl. No.: 15/852,469

(22) Filed: Dec. 22, 2017

(65) Prior Publication Data

US 2019/0196994 A1    Jun. 27, 2019

(51) Int. Cl.
| | |
|---|---|
| *G06F 13/28* | (2006.01) |
| *H04L 29/08* | (2006.01) |
| *G06F 13/40* | (2006.01) |
| *G06F 13/42* | (2006.01) |
| *G06F 3/06* | (2006.01) |

(52) U.S. Cl.
CPC ............ *G06F 13/28* (2013.01); *G06F 3/0629* (2013.01); *G06F 13/4022* (2013.01); *G06F 13/4068* (2013.01); *G06F 13/4282* (2013.01); *H04L 67/1097* (2013.01); *H04L 67/18* (2013.01); *G06F 2213/0026* (2013.01)

(58) Field of Classification Search
CPC ........... G06F 3/067; G06F 2009/45579; G06F 3/0631; G06F 2212/313; G06F 3/0629; G06F 16/1824; G06F 2211/1028; G06F 11/2094; G06F 3/0664; G06F 3/0676; G06F 3/0685; G06F 3/0689; G06F 3/061; G06F 3/0674; G06F 2212/262; G06F 3/0607; G06F 3/0683; G06F 40/123; G06F 8/65; G06F 13/4033; G06F 13/4068; G06F 13/4282; G06F 2211/104; G06F 2212/7202; G06F 16/00; G06F 3/0665; G06F 11/3442; G06F 3/0608; H04L 67/1097; H04L 41/22; H04L 41/0806; H04L 41/0681; H04L 41/0813; H04L 41/0843; H04L 41/0866; H04L 41/0803; H04L 41/0853; H04L 41/0893; H04L 41/085; H04L 67/34; H04L 67/18
USPC ........................................ 709/201, 220, 221
See application file for complete search history.

(56) References Cited

U.S. PATENT DOCUMENTS

| | | | |
|---|---|---|---|
| 6,317,879 B1 * | 11/2001 | Jacobson, Jr. ........ | G06F 9/4416 714/E11.179 |
| 7,478,178 B2 | 1/2009 | Tørudbakken et al. | |

(Continued)

FOREIGN PATENT DOCUMENTS

WO    WO 2015/200313 A1    12/2015

OTHER PUBLICATIONS

Product Brief, "PEX8733, PCI Express Gen 3 Switch, 32, Lanes, 18 Ports", PLX Technologies, Aug. 22, 2011, 5 pages.

*Primary Examiner* — Backhean Tiv
*Assistant Examiner* — Linh T. Nguyen
(74) *Attorney, Agent, or Firm* — Mueting Raasch Group

(57) ABSTRACT

Drive information related to data storage drives may be exchanged or communicated among switches and hosts to allow the switches and hosts access to the data storage drives. For example, each of the hosts may provide and maintain a storage stack to access data storage on storage drives operably coupled thereto and data storage drives operably coupled to other hosts.

17 Claims, 4 Drawing Sheets

(56) References Cited

U.S. PATENT DOCUMENTS

| | | | |
|---|---|---|---|
| 7,877,466 B2 * | 1/2011 | Chandrasekaran | G06F 15/177 709/220 |
| 7,921,262 B1 * | 4/2011 | Dask | G06F 12/00 711/154 |
| 8,296,476 B2 | 10/2012 | Zhang et al. | |
| 8,935,493 B1 * | 1/2015 | Dolan | G06F 3/0649 711/117 |
| 8,966,172 B2 | 2/2015 | Malwankar | |
| 9,557,992 B2 | 1/2017 | McCambridge et al. | |
| 2002/0087780 A1 * | 7/2002 | Selkirk | G06F 3/0622 711/6 |
| 2003/0204701 A1 * | 10/2003 | Mimatsu | G06F 3/0605 711/203 |
| 2006/0218357 A1 * | 9/2006 | Shimada | G06F 3/0611 711/150 |
| 2007/0070886 A1 * | 3/2007 | Zirin | G06F 11/1443 370/225 |
| 2007/0083657 A1 * | 4/2007 | Blumenau | G06F 9/468 709/226 |
| 2008/0147937 A1 | 6/2008 | Freimuth et al. | |
| 2008/0148041 A1 * | 6/2008 | Carlson | G06F 21/6218 713/151 |
| 2011/0106981 A1 * | 5/2011 | Watkins | G06F 13/4221 710/9 |
| 2011/0119423 A1 | 5/2011 | Kishore et al. | |
| 2012/0005440 A1 * | 1/2012 | Nakao | G06F 16/185 711/162 |
| 2012/0023297 A1 * | 1/2012 | Duzly | G06F 12/00 711/154 |
| 2012/0210063 A1 * | 8/2012 | Mimatsu | H04L 41/0856 711/114 |
| 2012/0221729 A1 * | 8/2012 | Hara | G06F 3/0605 709/226 |
| 2012/0278584 A1 * | 11/2012 | Nagami | G06F 3/0614 711/170 |
| 2013/0014102 A1 * | 1/2013 | Shah | H04L 67/32 718/1 |
| 2013/0054874 A1 * | 2/2013 | Myrah | G06F 3/0607 711/103 |
| 2013/0282998 A1 * | 10/2013 | Tatsumi | G06F 11/1456 711/162 |
| 2014/0156815 A1 * | 6/2014 | Kitahara | G06F 3/0605 709/221 |
| 2015/0106496 A1 * | 4/2015 | Tsao | G06F 11/2094 709/223 |
| 2015/0301759 A1 * | 10/2015 | Gu | G06F 3/0619 711/114 |
| 2017/0068471 A1 * | 3/2017 | Paveza | G06F 3/0619 |
| 2020/0241982 A1 * | 7/2020 | Iwamitsu | G06F 11/2033 |

\* cited by examiner

EXCHANGING DRIVE INFORMATION

The disclosure herein relates to exchanging drive information, and further to systems and methods for performing and implementing such drive information exchange.

SUMMARY

One exemplary system may include a plurality of switches, each operably couplable to one or more data storage drives, and a plurality of hosts, each host operably coupled to one or more data storage drives via a switch. Each host may include a processor configured to maintain a storage stack to access data storage on the one or more storage drives operably coupled to the host, and in response to operably coupling a new data storage drive to the switch, add new drive information into the storage stack. The processor may be further configured to communicate the new drive information to the other hosts to allow the other hosts to access the new data storage drive.

One exemplary network may include, a plurality of switches, each operably couplable to one or more data storage drives, and a plurality of hosts, each host operably coupled to one or more data storage drives via a switch. Each host may include a processor configured to maintain a storage stack to access data storage on the one or more storage drives operably coupled to the host and the one or more data storage drives operably coupled to the other hosts, receive new drive information from another host representative of a new data storage drive being operably to the another host, and add the new drive information into the storage stack.

One exemplary apparatus may include a plurality of switches, each operably couplable to one or more data storage drives, and a plurality of hosts, each host operably coupled to one or more data storage drives via a switch. Each host may include a processor configured to provide a storage stack to access data storage on the one or more storage drives operably coupled to the host and the one or more data storage drives operably coupled to the other hosts, and pre-allocate resources in the storage stack for each of the one or more data storage drives operably coupled to the other hosts.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
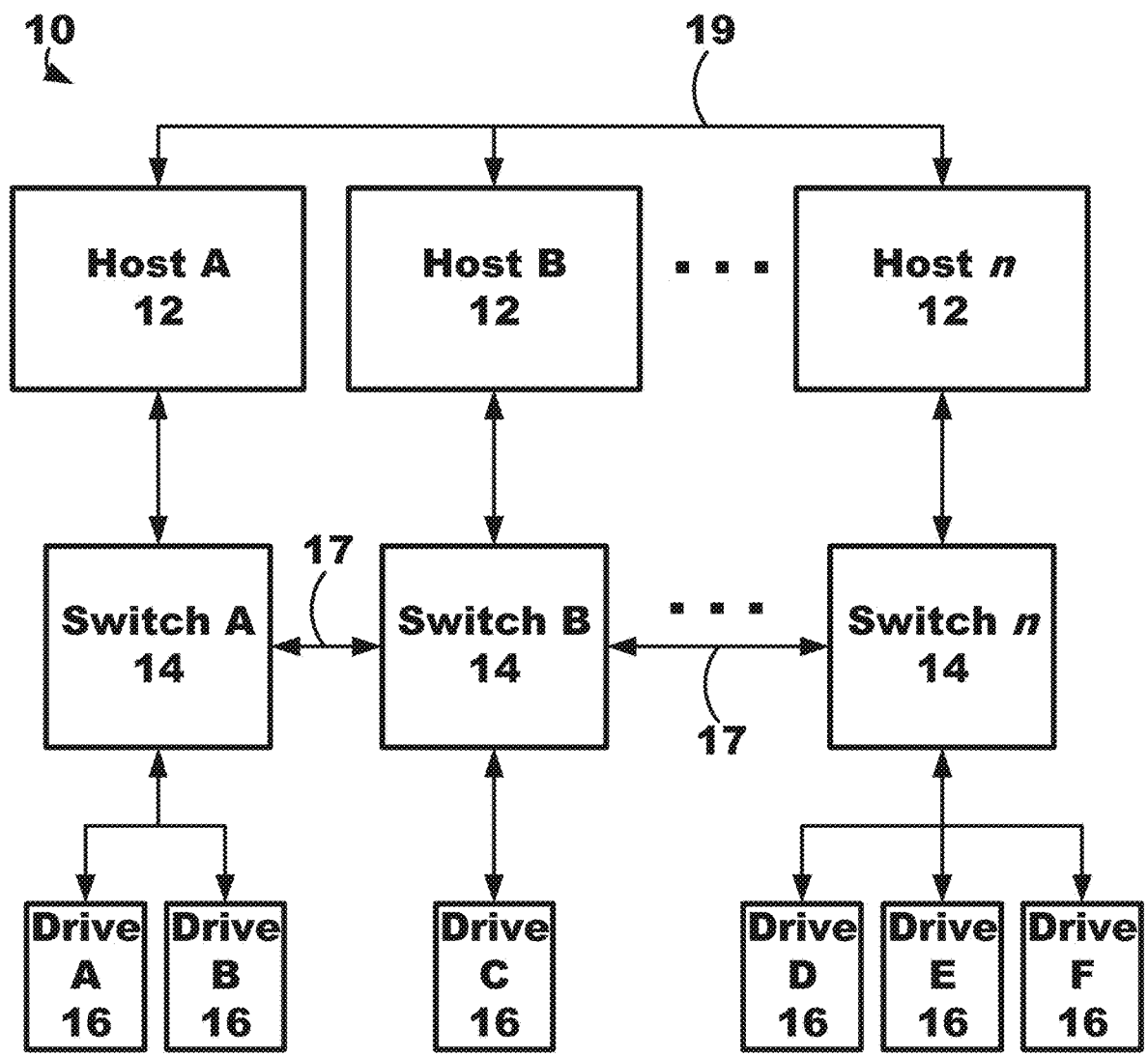
FIG. 1 is a block diagram including an exemplary system for use in exchanging, or sharing, drive information.

Exemplary systems, hosts, and methods shall be described with reference to FIGS. 1-4. It will be apparent to one skilled in the art that elements or processes from one embodiment may be used in combination with elements or processes of the other embodiments, and that the possible embodiments of such systems, apparatus, and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

With the advent of software-defined storage and virtualization technologies, modern day systems (including, e.g., enclosures, switches, etc.) may allow dynamic assignment/re-assignment of downstream storage drives between multiple upstream hosts (e.g., storage servers) attached to such systems. Multiple virtual switches (e.g., partitions) may exist within a single physical switch, and each host operably coupled to the physical switch may be described as "seeing" and enumerating only those downstream drives which are exposed to it by the virtualization logic of the switch. Further, multiple systems may be daisy chained together, and drives attached to these systems may be dynamically assigned to hosts. Each host, however, may have to be restarted and/or switching topology (e.g., PCIe topology) re-enumerated to use the drives.

In other words, drives that are "hot added" to into the system topology (e.g., to another host) may not be able to "hot added" into another host's topology because the host storage stack may not have pre-allocated necessary resources (e.g., bus addresses, Peripheral Component Interconnect Express (PCIe) base-address register (BAR) mapped I/O memory space, etc.) to control and utilize the drives. Further, hosts may require a restart of its storage stack and switching topology to be able to seamlessly enumerate and utilize the "hot added" drives. Further, re-enumeration, even if can be done without restarting the storage stack and switching topology, can cause potential disruptions to usage of existing drives. Still further, hosts may have zero visibility of storage drives operably coupled others hosts that can be potentially made available to it "on demand."

The exemplary systems, hosts, and methods may be described as providing "on-demand" storage (e.g., PCIe drive namespaces) to hosts that is potentially available to the host using or without using a separate application operating asynchronously with the host's own storage stack. In one or more exemplary embodiments, giving a "fdisk-1" command will list attached as well as potentially available drives on a host. The potentially-available drives may be described as being "spoofed" on the host, and an attempt by a host to actually mount or perform input/output with a "spoofed" drive will trigger a "hot add" of the spoofed drive making such drive available to the host utilizing pre-provisioned or pre-allocated resources.

In one or more exemplary embodiments, the storage stack of a host (e.g., PCIe root port software stack) can make use of a "dynamic storage software agent" to reserve drive information such as, e.g., bus address, BAR mapped memory space, etc. that will be used when drive is "hot added" in future. Since the drive information is already reserved, or pre-allocated, the host does not need to be restarted and the switching topology does not need to be rescanned to facilitate such "hot adds." Further, in one or more exemplary embodiments, the hosts can continually communicate within each other through, e.g., use of the "dynamic storage software agent" to resolve unused drives in topology and make a demand for same as and when necessary.

The exemplary systems, hosts, and methods may be described as being transport layer independent because, for example, the agent may communicate with the storage stack of the hosts and may utilize multiple transport options, depending on the varying capabilities of the hardware. For example, some switches in a topology may not support RDMA, and thus, the agent can rely on ethernet to maintain synchronization within the hosts.

In one or more exemplary embodiments, it may be described that the systems, hosts, and methods may be configured to detect all storage drives that would typically "invisible" to a storage stack (e.g., PCIe root stack) of a host as such storage drives are attached to separate physical/ virtual switches. Further, the systems, hosts, and methods may be configured to allow drive information (e.g., including PCIe configuration registers BAR mapped registers, etc.) of the "invisible" storage drives to be communicated to the hosts. The storage stack of the hosts can use this infrastructure to enumerate the "invisible" drives and pre-allocate necessary resources for future "hot additions" of such "invisible" drives. After such enumeration and pre-allocation, the previously "invisible" drives may be described as being "spoofed" as available to the host. Further, all hosts may be detected in a multi-switch topology such that they may communicate with each other and exchange drive information to facilitate "hot additions" of drives (e.g., a host that may intend to mount a "spoofed" may first communicate with other hosts to ensure that same is not being used by any other hosts).

In other words, the exemplary systems, hosts, and methods may be described as being able solve the "hot addition" of drives to hosts while allowing access to such drives to other hosts without rebooting the system and/or hosts. To do so, the exemplary systems, hosts, and methods may include a suite of application protocol interfaces (APIs) to upstream hosts for managing "hot pluggable" drives and "dynamic storage software agent" that may be used by datacenter customers to manage dynamically assignable "on demand" storage spread across multiple switching topologies in storage area networks.

Thus, the exemplary systems, hosts, and methods may be further described as providing a host storage stack with a "socket type" interface using which host storage stack can read drive information (e.g., PCIe configuration registers, namespace details, capacity, temperature, monitoring data, NVMe specification "identify" command, response data, etc.) of drives available to other hosts as if the drives are directly connected through a switch. This allows these drives available to other hosts to be "spoofed" by storage stacks and made available to application layers for future use. An attempt by host software to mount and/or perform IOs with these "spoofed" drives may cause the host's and/or enclosure's "drive hot addition" logic to initiate and attach the drive into said host's switch topology.

An exemplary storage network system 10 (e.g., a storage area network) is depicted in FIG. 1. The system 10 may include a plurality of hosts 12, a plurality of switches 14, and a plurality of data storage drives 16. Although three hosts 12, three switches 14, and six data storage drives 16 are depicted in FIG. 1, it is to be understood the system 10 may employ, or include, any number of hosts 12, switches 14, and data storage drives 16, and the system 10 as depicted is merely one example. The system 10 may be described as being one or more data storage enclosures configured to be operably coupled to a plurality of data storage drives 16. The data storage drives 16 may be removably coupled to the data storage enclosures such that a user may remove one or more of the data storage drives 16 from the switches 14 of the enclosures (when, e.g., a drive 16 fails) or may add one or more of the data storage drives 16 to the switches 14 of the enclosures (to, e.g., add data storage or replace a failed drive). Further, in one or more embodiments, a user may install or remove one or more data storage drives 16 into the data storage enclosure (e.g., attached to the switches 14) without rebooting or power cycling one or more hosts 12 the system 10. In other words, the data storage drives 16 may be "hot swapped" into and out of the system 10 or within the hosts 12. In at least one embodiment, the system 10 includes is a rack-mountable enclosure that is configured to be used in a datacenter among servers and other similar enclosures. Further, the system 10 may include many components that are outside the scope of the disclosure but may still be contemplated herein such as, for example, a power supply, cooling apparatus, networking apparatus, etc.

The hosts 12 may be any computing device or apparatus that is configured to input and output data from the plurality of data storage drives 16. Generally, the hosts 12 may request data or may request to write, or store, data on the system 10. Each of the hosts 12 may be operably coupled to a switch 14 (e.g., a PCIe switch). Each of the switches 14 may be a physical switch or a virtual switch. For example, multiple hosts 12 may be operably coupled to a single physical switch, but each host 12 may be virtually separated from one another such that each host 12 has its own virtual switch 14. In one or more embodiments, the switch 14 may be part of the host 12.

Each switch 14 may be operably coupled to one or more data storage drives, or devices, 16 to allow the associated host 12 to read and write data from and to the data storage drives 16. The switches 14 may use any protocol and/or interface so as to provide input to and output from the associated host 12 and the associated data storage drives 16. In one embodiment, the switches 14 are PCIe switches. In other embodiments, the switches may be SCSI switches, SAS switches ATA over Ethernet switches, fibre channel switches, and/or ethernet switches. Further, all of the switches need not utilize the same protocol and/or interface. For example, in one embodiment, the system 10 may include a PCIe switch and an ethernet switch. In other words, the system 10 may include switches 14 of different types (e.g., a switch of a first type, a switch of a second type different than the first type).

The data storage drives 16 may include any device and/or apparatus configured to store data (e.g., binary data, etc.). The data storage drives 16 may include one or more storage mediums that can include, but is not necessarily limited to, solid state memory, hard magnetic discs, magnetic tapes, optical discs, integrated circuits, volatile memory, nonvolatile memory, and any combination thereof. Each of the data storage drives 16 may include the same type or a different type of storage mediums. For example, each of the data storage drives 16 may include solid-state memory. In other words, each of the data storage drives 16 may be solid-state drives (SSD). In another example, some of the data storage drives 16 may include solid-state memory and some of the data storage drives 16 may include hard magnetic discs.

In other words, FIG. 1 depicts the different elements of one embodiment of the exemplary system 10. Hosts A-n 12 are attached to their own switches, or switching topologies, 14. The exemplary systems, hosts, and methods described further herein may allow the hosts 12 to read and write data from drives 16 in different switches, or switching topologies 14 associated with different hosts 12 by exchanging, or sharing, drive information between each other. For example, in one embodiment, the host A 12 can access PCIe configuration registers and BAR mapped locations of drive C 16 from host B 12. Similarly host B 12 can access PCIe configuration registers and BAR mapped locations of drive A 16.

Figure 2:
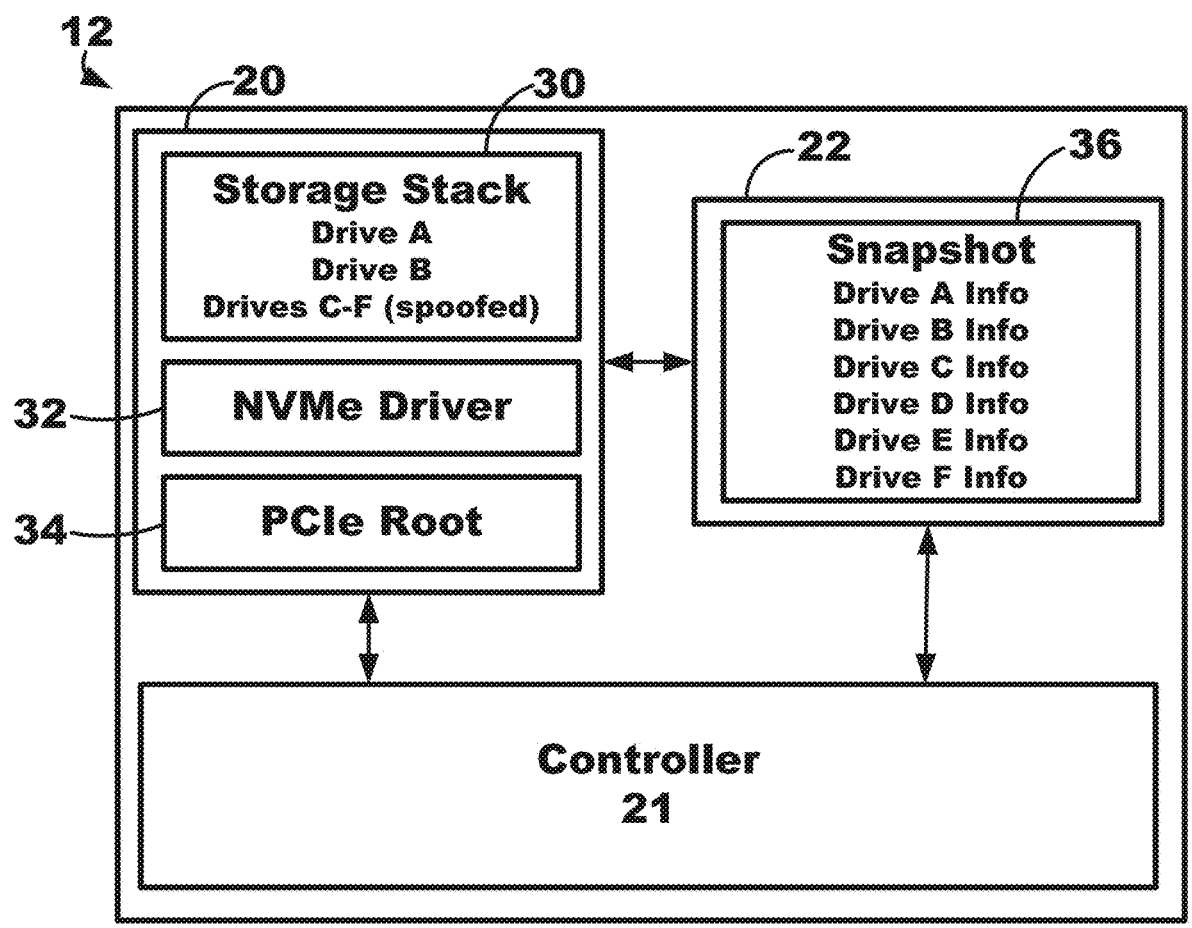
FIG. 2 a block diagram of an exemplary host of the system of FIG. 1.

An exemplary host 12 is depicted in FIG. 2. In this example, the host 12 of FIG. 2 corresponds to host A 12 of FIG. 1. As shown, a host 12 may include a controller 21, data 20, and a drive information agent 22. The controller 21 may include various circuitry, logic, memory, etc. for use in reading, writing, moving, erasing, etc. data from the plurality of data storage drives 16. For example, the controller 21 may include one or more circuit components such as integrated circuits, processors, etc. that may be configured to interface with the switches 14 so as to be operably coupled to data storage drives 16 to read (e.g., including decoding) therefrom and write data thereon. Further, as described further herein, the controller 21 may be operated by the drive information agent 22 to, e.g., provide the drive information exchange described herein.

The methods, techniques, and/or processes described in this disclosure, including those attributed to the controller 21 of the host 12 may include one or more processors, or various constituent components, and may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "controller," "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same apparatus or within separate apparatuses to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, apparatus, and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

The data 20 may include the information and resources used by the controller 21 to access data of the plurality of data storage drives 16 via the plurality of switches 14. For example, the data 20 may include a storage stack 30 that includes drive information for each of the data storage drives 16 operably coupled to the host 12 via its own associated switch 14 and drive information for each of the data storage drives 16 operably coupled to other hosts 12 via their own associated switches 14.

More specifically, the storage stack 30 and NVMe driver 32 may include, among other things, namespace information, protocol bus configuration information, address resource information, namespace/LUN size, multipath IO capabilities information, namespace sharing information, and any other information related thereto (e.g., capacity information, physical information such as temperature, etc.) for each of the one or more storage drives 16 of the host 12 (e.g., operably coupled to the via the associated switch 14) and for each of the one or more storage drives 16 of the other hosts 12. For example, as shown in FIG. 2, the storage stack 30 of the host A 12 includes drive information for drive A 16 and drive B 16 (i.e., the drives 16 operably coupled to the host A 12 via the associated switch A 14 in the system 10 of FIG. 1). Since drives A & B 16 are at present associated with host A 12, such drives may be "mounted" into the file system provided by host A 12 for reading therefrom and writing thereto.

Further, for example, as shown in FIG. 2, the storage stack 30 of the host A 12 includes drive information for drives C-F 16, which are the drives 16 at present associated with the other hosts 12 of FIG. 1 (i.e., the drives 16 operably coupled to the hosts B & n 12 via the associated switches 14 in the system 10 of FIG. 1). As will be described further herein, since drives C-F 16 are not associated with host A 12, the drive information in the storage stack 30 may be pre-allocated such that such drives may be "mounted" into the file system provided by host A 12 for reading therefrom and writing thereto without rebooting the hosts 12 and/or system 10 and without a rescanning the system 10 to find additional data storage drives 16 and information associated therewith.

Although the data 20 may further include, in this example, a Non-Volatile Memory Express (NVMe) driver 32 and a Peripheral Component Interconnect Express (PCIe) root 34, it is to be understood that the exemplary systems and hosts may utilize any data storage drivers, protocols, and interfaces to provide the data management functionality described herein.

The exemplary host 12 further includes a drive information agent 22, that may be executed by the controller 21 or other control and processing circuitry, to maintain drive information with respect to all the drives 16 of the system 10. For example, in this embodiment, the drive information agent 22 maintains a snapshot 36 that includes drive information with respect to each of the plurality of data storage drives 16 of the system 10.

The drive information agent 22 may be configured in a plurality of different ways to maintain and exchange the drive information among drive information agents 22 of other hosts 12. For example, when a new drive is operably coupled to the host A 12 via the associated switch 14, the snapshot 36 may be updated with the drive information for the new drive. The drive information agent 22 may send the new drive information and/or snapshot 36 to the drive information agent 22 of the other hosts B-n 12. In other embodiment, the drive information agents 22 of the plurality of hosts 12 may query each other (e.g., periodically) to obtain any new drive information and/or snapshots 36 from each other. Likewise, if a data storage drive 16 is removed from being operably coupled to the host A 12 via the associated switch A 14, the snapshot 36 of host A 12 may be updated to not include the drive information associated with the removed drive, and such removed drive data and/or updated snapshot 36 may be exchanged (e.g., shared, communicated, etc.) to the other hosts B-n 12.

In other words, FIG. 2 may be described as including a logical representation of a dynamic storage software agent 22 resident in the host 12 and interfacing with other agents 22 of other hosts 12. Each instance of the agent 22 may maintain a snapshot 36 of drive information (e.g., PCIe configuration, BAR mapped memory/registers, etc.) of all drives associated with its host 12 and may renders the same to the agent 22 of other hosts 12. Alternatively, the agent 22 may actually access the drive information (e.g., PCIe configuration and BAR mapped memory/registers) of drives 16 each time an agent 22 of a peer host 12 requests access.

The drive information may be exchanged (e.g., communicated, shared, etc.) among agents 22 of the hosts 12 in a plurality of different ways. For example, the plurality of switches 14 may be operably coupled to each other using an in-band communication channel 17, and the drive information may be communicated between hosts 12 and switches 14 using the in-band communication channel 17. In one embodiment, the in-band communication channel 17 may utilize remote direct memory access (RDMA) such that the agents 22 may directly access the snapshot 36 of other hosts 12.

In another embodiment, the switches 14 may be virtual switches virtualized on the same physical switch, and the in-band communication channel 17 may use shared registers (e.g., doorbell, etc.) on the same physical switch such that the agents 22 may directly access the snapshot 36 of other hosts 12.

Further, for example, the plurality of hosts 12 may be operably coupled to each other using a side-band communication channel 19 and the exchange of the drive information among hosts 12 may be via the side-band communication channel 19. In one embodiment, the side-band communication channel 19 is ethernet. In other embodiments, the side-band communication channel 19 may be one or more of scratchpad registered (between virtual switches), etc.

In other words, the exemplary systems, hosts, and methods may be described as providing a dynamic storage information exchange. All hosts 12 in a storage topology may render drive information (e.g., PCIe address, configuration register, BAR access, etc.) that can be dynamically assigned/re-assigned and seen by itself with peer hosts 12. The drive information exchange or sharing may be achieved by means of following transport mechanisms: sideband transport where hosts 12 may employ sideband transport such as, e.g., ethernet or as scratchpad registers, to exchange information regarding storage that can be dynamically assigned/re-assigned; and in-band transport where storage switches 14 (e.g. PCIe switches) may provide infrastructure to exchange data between upstream hosts such remote direct memory access (RDMA). The scratchpad registers may be provided by switches 14 that are virtualized on a single physical switch so as to exchange information amongst themselves regarding dynamic storage. The RDMA process, or engines, may be programmed by hosts 12 and/or switches 14 to transfer information regarding the drive information to other hosts 12 and/or switches 14 in the topology especially when the hosts 12 are connected to different physical switches.

This drive information exchanged or shared may be facilitated by the dynamic drive information agent 22 that can interface with the storage stack 30 in the host 12 and the sideband and in-band communication, or transport, channels 19, 17. An instance of the agent 22 may run in or on each of the hosts 12 and may communicate with other hosts 12 through the sideband and in-band communication channels 19, 17. Further, the agent 22 may provide the drive information (e.g., PCIe configuration, BAR access) to agents 22 of peer hosts 12 by interfacing with the local storage stack 30, the NVMe driver 32, and the PCIe root stack 34. Further, the agent 22 may read drive information (e.g., PCIe configuration registers, etc.) from the agent 22 of peer hosts 12 thereby allowing hosts 12 to reserve resources (e.g., PCIe bus addresses) in advance for each potential storage drive 16 that may be switched over to itself in future. Further, in one or more embodiments, the exemplary hosts 12 may only be given read access to drive information (e.g., PCIe configuration registers, BAR mapped locations of PCIe drives, etc.) on other hosts 12, which can prevent unintentional malfunction of drives 16 in a different host's topology.

Figure 3:
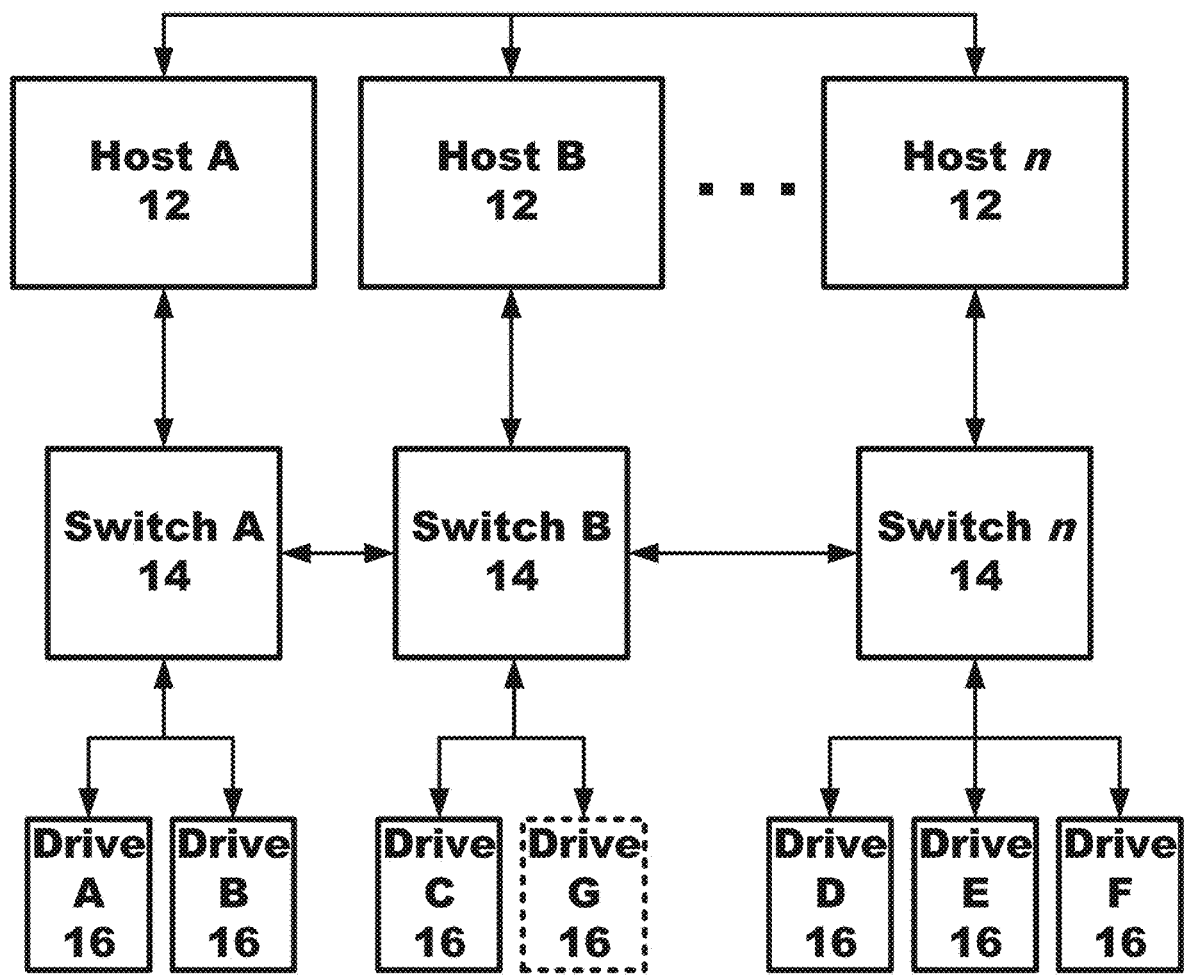
FIG. 3 is the block diagram of the system of FIG. 1 depicting the addition of a drive.
Figure 4:
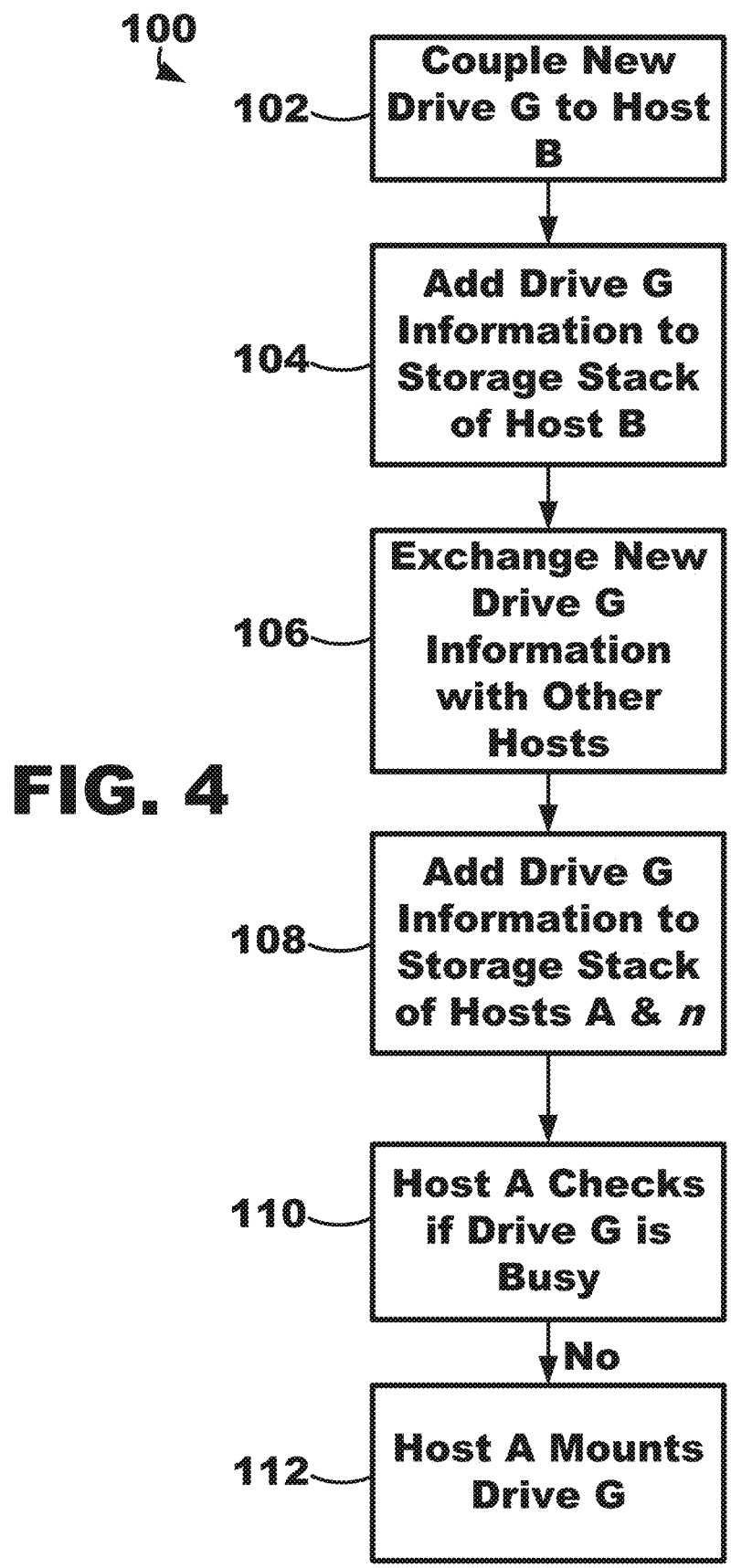
FIG. 4 is a block diagram an exemplary method of adding a drive to a host, communicating drive information to other hosts, and mounting the drive by another host.

An exemplary method 100 according to the present disclosure is depicted in FIG. 4. The exemplary method 100 includes adding 102 data storage drive G 16 to a host B 12 as shown in FIG. 3. More specifically, the data storage drive G 16 has been operably coupled to the switch B 14, which corresponds to host B 12. In response to the drive G 16 being operably coupled to the switch B 14, and thus, the host B 12, the drive information (e.g., namespace, bus configuration information, address resource information, etc.) may added 104 to the storage stack of host B 12.

The newly added drive information related to the drive G 16 may be exchanged 106 with the other hosts A & n 12 using side-band or in-band communication channel. Further, as described herein, the newly added drive information related to the drive G 16 can be exchanged or communicated to the other hosts A & n 12 in many ways. For example, the drive information can be sent by the agent of host B 12 to the others hosts A & n 12, the drive information can be requested (e.g., periodically) by the others hosts A & n 12 and in response, to such request, the agent of host B 12 can send the drive information to the others hosts A & n 12, and/or the others hosts A & n 12 may directly read the drive information from the agent of the host B 12.

Once the drive information related to drive G 16 has been exchanged or communicate to another host 12 such as, for example, host A 12, the host A 12 can then add 108 the drive information related to drive G 16 to its storage stack thereby pre-allocating and reserving the resources that may be used to mount the drive G 16 at later time. Thus, drive G 16 may be "spoofed" in the storage stack of host A 12.

In response to a request from host A 12 to read or write data from drive G 16, the host A 12 may check 110 to see if drive G 16 is busy (e.g., being used by another host, etc.). If drive G 16 is not busy (e.g., not being used by another host, etc.), the host A 12 may mount 112 the drive G 16 into the file system of host A 12 based on the drive information related to drive G 16 in the storage stack of host A 12 to allow reading therefrom and writing thereto.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g., 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise. As used herein, "or" is generally employed in its sense including "and/or" unless the content clearly dictates otherwise. As used herein, "have," "having," "include," "including," "comprise," "comprising," or the like are used in their open-ended sense, and generally mean "including, but not limited to."

Embodiments of the systems, apparatus, and methods for phase slip recovery are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. A system comprising:
a plurality of switches, each operably couplable to one or more data storage drives; and
a plurality of hosts, each host operably coupled to one or more data storage drives via a switch, comprising a processor configured to:
maintain a storage stack to access data storage on the one or more storage drives operably coupled to the host, wherein the storage stack comprises drive information for each of the one or more data storage drives and the drive information comprises one or more of namespace information, bus configuration information, and address resource information for each of the one or more storage drives of the host,
in response to operably coupling a new data storage drive to the switch, add new drive information for the new data storage drive into the storage stack, and
communicate the new drive information for the new data storage drive to the other hosts to allow the other hosts to access the new data storage drive.

2. The system of claim 1, wherein the communication of the new drive information to the other hosts to allow the other hosts to access the new data storage drive comprises the other hosts reading the new drive information.

3. The system of claim 1, wherein the communication of the new drive information to the other hosts comprises sending the new drive information to the other hosts.

4. The system of claim 1, wherein the switch is a Peripheral Component.

5. The system of claim 1, wherein the plurality of switches are operably coupled to each other using an in-band communication channel and the communication of the new drive information to the other hosts is via the in-band communication channel.

6. The system of claim 5, wherein the in-band communication channel use remote direct memory access (RDMA).

7. The system of claim 5, wherein two of the plurality of switches are virtual switches virtualized on the same physical switch and the in-band communication channel uses shared registers on the same physical switch.

8. The system of claim 1, wherein the plurality of hosts are operably coupled to each other using a side-band communication channel and the communication of the new drive information to the other hosts is via the side-band communication channel.

9. The system of claim 8, wherein the in-band communication channel uses ethernet.

10. A network comprising:
a plurality of switches, each operably couplable to one or more data storage drives; and a plurality of hosts, each host operably coupled to one or more data storage drives via a switch and comprising a processor configured to:
maintain a storage stack to access data storage on the one or more storage drives operably coupled to the host and the one or more data storage drives operably coupled to the other hosts,
receive new drive information for a new data storage drive from another host representative of the new data storage drive being operably coupled to the another host, the receiving new drive information for the new data storage drive from the other host comprising reading the new drive information for the new data storage device from another host or requesting the new drive information for the new data storage device from the another host, and
add the new drive information into the storage stack, wherein the storage stack comprises drive information for each of the one or more data storage drives and the drive information comprises one or more of namespace information, bus configuration information, and address resource information for each of the one or more storage drives of the host.

11. The network of claim 10, wherein the processor is further configured to: mount the new data storage drive for reading and writing in response to a read or write request based on the new drive information.

12. The network of claim 11, wherein the processor is further configured to: checking whether the new storage drive is busy; and
only mount the new data storage drive for reading and writing if the new data storage drive is not busy.

13. The network of claim 10, wherein the plurality of switches are operably coupled to each other using an in-band communication channel and the communication of the new drive information to the other hosts is via the in-band communication channel.

14. The network of claim 10, wherein the plurality of hosts are operably coupled to each other using a side-band communication channel and the communication of the new drive information to the other hosts is via the side-band communication channel.

15. An apparatus comprising:
a plurality of switches, each operably couplable to one or more data storage drives; and a plurality of hosts, each host operably coupled to one or more data storage drives via a corresponding switch and comprising a processor configured to:

provide a storage stack to access data storage on the one or more storage drives operably coupled to the host and the one or more data storage drives operably coupled to the other hosts, wherein the storage stack includes drive information for the one or more storage drives and the drive information comprises one or more of namespace information, bus configuration information, and address resource information for each of the one or more storage drives of the host, and in response to operably coupling a new data storage drive to the corresponding switch, add new drive information into the storage stack, and communicate the new drive information to the other hosts to allow the other hosts to pre-allocate resources in the storage stack, and pre-allocate resources in the storage stack for each of the one or more data storage drives operably coupled to the other hosts.

16. The apparatus of claim 15, wherein the plurality of switches are operably coupled to each other using one or both of an in-band communication channel and the communication of the new drive information to the other hosts is via the in-band communication channel and a side-band communication channel and the communication of the new drive information to the other hosts is via the side-band communication channel.

17. The apparatus of claim 15, wherein the communication of the new drive information to the other hosts comprises sending the new drive information to the other hosts.

* * * * *

UNITED STATES PATENT AND TRADEMARK OFFICE
CERTIFICATE OF CORRECTION

PATENT NO.       : 11,194,746 B2
APPLICATION NO.  : 15/852469
DATED            : December 7, 2021
INVENTOR(S)      : Sumanranjan Swadesranjan Mitra and Robert Walker Page 1 of 1

It is certified that error appears in the above-identified patent and that said Letters Patent is hereby corrected as shown below:

In the Claims

Claim 6, Column 10, Line 7, 'use' should be --uses--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*